US008532389B2

United States Patent
Mossakowski

(10) Patent No.: US 8,532,389 B2
(45) Date of Patent: Sep. 10, 2013

(54) METHOD FOR IMAGE ANALYSIS, ESPECIALLY FOR MOBILE STATIONS

(75) Inventor: Gerd Mossakowski, Ahlen (DE)

(73) Assignee: T-Mobile International AG, Bonn (DE)

( * ) Notice: Subject to any disclaimer, the term of this patent is extended or adjusted under 35 U.S.C. 154(b) by 378 days.

(21) Appl. No.: 12/740,047

(22) PCT Filed: Oct. 28, 2008

(86) PCT No.: PCT/EP2008/009093
§ 371 (c)(1),
(2), (4) Date: Aug. 4, 2010

(87) PCT Pub. No.: WO2009/059715
PCT Pub. Date: May 14, 2009

(65) Prior Publication Data
US 2010/0296729 A1    Nov. 25, 2010

(30) Foreign Application Priority Data
Nov. 5, 2007 (DE) .................. 10 2007 052 622

(51) Int. Cl.
*G06K 9/00* (2006.01)
*G06K 9/18* (2006.01)

(52) U.S. Cl.
USPC .......................................... 382/182; 382/165

(58) Field of Classification Search
USPC ............... 382/181–182, 190, 195, 197, 202, 382/162, 165
See application file for complete search history.

(56) References Cited

U.S. PATENT DOCUMENTS 4,685,142 A * 8/1987 Ooi et al. ...................... 382/185
5,182,777 A * 1/1993 Nakayama et al. ........... 382/170
(Continued)

FOREIGN PATENT DOCUMENTS

| CN | 1075565 | 8/1993 |
| CN | 1075811 | 9/1993 |

(Continued)

OTHER PUBLICATIONS (*) = Foreign patent document together with English language abstract.

(Continued)

*Primary Examiner* — Li Liu
(74) *Attorney, Agent, or Firm* — Faegre Baker Daniels LLP

(57) ABSTRACT

A robust OCR system requiring little computing capacity is obtained by first carrying out an adaptive pre-processing optimised in terms of pixel groups, which analyses the image in line segments. The most significant difference compared to previously known methods is that there is no longer a direct pattern comparison, instead the line segments are gone over in as optimum a manner as possible. The corresponding character is then deduced from the sequence of movements. As this sequence of movements can be scaled well and described in a relatively simple manner, this technique is especially suitable for mobile use. The sequence of movements of know characters is stored in a search word, such that the letters can be directly deduced from the movement. A dictionary/lexicon can also be used. If words are recognized by means of the dictionary/lexicon, the recognized letters can be used for an even more optimized character font identification. The invention is advantageous in that a robust OCR system is provided, which also requires little computing capacity. The system according to the invention is robust especially in that the recognition works better than with conventional systems even under bad conditions, especially light ratios and interferences.

10 Claims, 3 Drawing Sheets

(56) References Cited

U.S. PATENT DOCUMENTS

| | | | |
|---|---|---|---|
| 5,319,721 A * | 6/1994 | Chefalas et al. | 382/160 |
| 5,796,867 A * | 8/1998 | Chen et al. | 382/187 |
| 5,940,534 A * | 8/1999 | Wakahara et al. | 382/187 |
| 6,807,309 B1 | 10/2004 | Krtolica | |
| 6,970,599 B2 * | 11/2005 | Longe et al. | 382/185 |
| 7,359,560 B2 | 4/2008 | Mossakowski | |
| 2004/0095996 A1 | 5/2004 | Mossakowski | |

FOREIGN PATENT DOCUMENTS

| | | |
|---|---|---|
| DE | 100 25 017 | 12/2000 |
| DE | 101 13 880 | 10/2002 |
| DE | 101 63 688 | 7/2003 |
| DE | 20 2005 018 376 | 2/2006 |
| DE | 10 2005 033 001 | 1/2007 |
| JP | 59-17668 | 1/1984 |

OTHER PUBLICATIONS

Wu, Yeng-fei et al., "Using Condensation Tracking to Recover Stroke Order of Chinese Calligraphic Handwritings with CCM", Eight International Workshop on Image Analysis for Multimedia Interactive Services, 2007.

Chinese Office Action dated Feb. 28, 2013 in corresponding Chinese Application No. 200880114728.X.

* cited by examiner

METHOD FOR IMAGE ANALYSIS, ESPECIALLY FOR MOBILE STATIONS

This application is related to and claims the benefit under 35 U.S.C. §119 and 35 U.S.C. §365 of International Application No. PCT/EP2008/009093, filed Oct. 28, 2008, which claims the benefit of German Patent Application No. 10 2007 052 622.0, filed Nov. 5, 2007, the disclosure of PCT/EP2008/009093 is expressly incorporated herein by reference.

The invention relates to a method for image analysis, especially for a mobile station with a built-in digital camera for automatic optical character recognition, in accordance with the characterizing clause of patent Claim 1 or 2.

There are a number of OCR systems for PCs. Typically a flat-bed scanner is used for the scanning of texts. There are hand scanners for mobile use, said hand scanners displaying the scanned in text on a display, saving or transferring said text to a computer. There are always problems when the prototype is scanned in crooked, or only letters of the fragments are to be recognized (for example lettered flag in the wind). In addition such techniques fail when direct scanning is not possible (e.g. signs on the side of the road). In accordance with today's state of the art such an image could be recorded with high resolution, said image being able to be scanned afterwards. However, in the camera itself direct OCR does not take place, since this is too processor intensive with conventional methods.

If longer texts are to be recognized, it is frequently necessary to record several images and then merge them (putting together 360° photos). In order to get sufficient quality, the operation as a rule must still be manually reworked.

Essential methods for OCR work with a pure bit pattern comparison "pattern matching" or as is the case with handwriting recognition with the description of the letters by lines and intersection points. Pattern matching can be employed especially well when it is a matter of standard letters (e.g. vehicle registration plate). In the case of the recognition of license plates the characters to be recognized are restricted to a small number, which are in addition standardized.

In addition different applications in the field of augment reality are known. Serving as an example of this is the superimposition of a photograph (satellite photo) with a street map which shows the individual street names.

The state of the art is a method of the prioritizing pixel groups in accordance with DE 10113880 B4 or its equivalent EP 1371229 B1, which disclose the features in accordance with the characterizing clause of patent claim 2.

De 10025017 A1 discloses a mobile telephone which is suitable in particular for a simpler application and usage of special services and functions, such as e.g. short message service, payment transactions, identity or security checks etc. The mobile telephone possesses an integrated device for the reading of characters, symbol codes and/or (identity features, which is a scanner, a bar code reader or a finger print reader in the form of a CCD sensor. With this a convenient and rapid input and recording of text, symbols or security relevant features is possible.

DE 202005018376 U1 discloses a mobile telephone with a keyboard, monitor, data processing system and an optical scanning system arranged behind an opening or a window of the housing, in particular a hand scanner, as well as an integrated translation program. Via the optical scanning system it is possible to scan in characters and/or words present in another language. With the selection of the language the translation of the word or the words takes place. This can advantageously be menus, warning notices, operating instructions and maps as well as signs. In addition the user can also enter words himself via the keyboard of the mobile telephone or select an lexicon contained in the memory of the data processing system. By linking up the data processing system with the monitor and the keyboard these words are translated and displayed on the monitor through the selection of the language.

DE 10163688 A1 discloses a method and a system for the tracking of goods which are provided with an optically readable, alphanumeric coding, as well as a data acquisition device for this purpose. The coding is acquired as an image by the data acquisition device and converted into image data. Said image data are sent from the data acquisition device by radio to a receiver who is connected to a computer system which further evaluates the image data. Alternatively the image data are evaluated in the data acquisition device prior to sending to the receiver. How precisely the evaluation of the image data takes place is not disclosed in greater detail.

DE 10 2005 033 001 al discloses a method for image processing in mobile terminals e.g. mobile telephones with a camera which photographs digital image information and analyses this image information, partially with the help of pattern recognition methods, such as for example text recognition methods (OCR). How precisely these text recognition methods (OCR) work is however not described in this publication.

The object of the present invention is therefore to provide a generic method for image processing in mobile end devices with a digital camera which works significantly more precisely and rapidly.

The invention is characterized by the features of the independent patent Claim 1 or 2.

Advantageous improvements are the subject matter of the dependent patent claims.

The advantage of the invention is a more robust OCR acquisition with optional translation in real time which also manages with comparatively little computing capacity. The robustness relates in particular to the fact that the recognition also functions under poor conditions (in particular light conditions, interference) better than conventional systems.

This is for one thing achieved as a result of the fact that first an adaptive pre-processing optimized in terms of pixel groups is carried out which analyzes the image in line segments. The most significant difference compared to previously known methods is the fact that no further direct pattern comparison takes place, but rather the line segments are gone over in as optimum a manner as possible. The corresponding character is then deduced from the sequence of movements. Since this sequence of movements can be scaled well and described with relatively little expenditure this technique is particularly suitable for mobile use. The sequence of movements of known characters is stored in a search word so that the letters can be directly deduced from the movement. In addition a dictionary/lexicon can be used. If words are recognized with the help of the dictionary/lexicon, the recognized letters can be used for an even more optimized character font recognition.

Application scenarios are camera cell phones for tourists abroad, in particular in order to be able to read traffic signs, menus, general signs. In the process the content can be translated immediately into a $2^{nd}$ language. The translation is displayed to the user on the display, or read out via a "text to speech application".

The robustness of the recognition is based first on a standardization of line segment widths, or letter sizes. Then the letters are gone over, wherein then within the scope of the tracing the actual letters can be recognized. The robustness of the recognition method arises from the combination of different solution steps. Through the standardization of the line segment widths shadow effects and poor lighting conditions barely have an influence on the recognition rate. Through the size standardizations the effects on e.g. distant signs can be compensated. Through the tracing one reaches the correct letter or numeral by means of simple, less expensive, but expandable solution trees. In order to make the results even more robust, in addition a dictionary can also be used. Through acknowledgments of recognized words solution trees and line segment widths of the prototype can be correspondingly optimized.

The following steps illustrated in FIGS. 1A and 1B are performed for the solution of the problem.

Figure 1A:
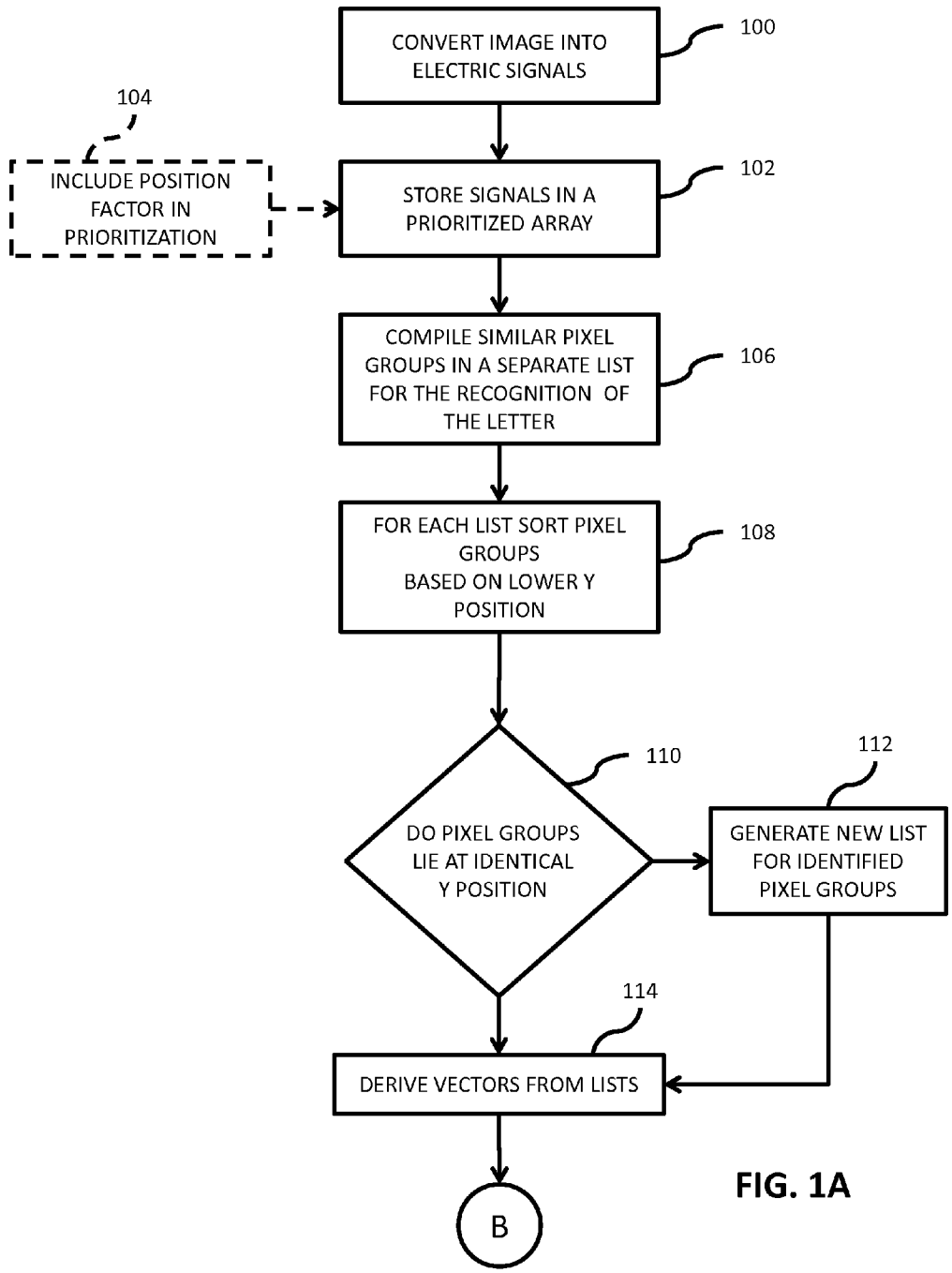
FIGS. 1A and 1B illustrate a processing sequence.

Referring to FIG. 1A, the image is converted into electric signals with an image recording element (e.g. CCD camera), as represented by box 100. These signals are then stored in a prioritized array, as represented by box 102, in accordance with the method according to the patent DE 101 13 880 B4, the disclosure of which is expressly incorporated by reference herein.

As mentioned in DE 101 13 880 B4, the prioritized array contains at this moment in time the current pixel values sorted by priority. A pixel receives a high priority if the differences in relation to its neighboring pixel are great. The pixel is combined into a pixel group together with its neighboring pixels used for the calculation. Corresponding to the prioritization these pixel groups are transmitted or stored.

Optionally in addition a position factor can flow into the prioritization, as represented by block 104. The position factor is all the greater/larger the closer the pixel group is to the start pixel. The start pixel is located in the case of most western languages (English, German, French) first in the upper left corner of the array.

In contrast to the patent DE 101 13 880 B4, which works with a previously defined recognition operation, the pixel groups here can also vary during the recognition operation. One example of a pixel group is a one-line horizontal arrangement of pixels whose length is dependent on a double alternation of the brightness. In the case of dark letters to be recognized on a light background the distance between the first light-dark transition and the following dark-light transition would be one variable for an assumed line segment width. Pixel groups of identical assumed line segment widths are each compiled in a separate list. In order to increase the robustness of the method vis-à-vis pixel errors in addition it is possible to work with a low pass filter. In the case of this filter the sum of n adjacent pixels is taken in order to find corresponding light-dark or dark-light transitions. Through the totaling any pixel errors or errors through heavy noise are greatly lessened.

Figure 1B:
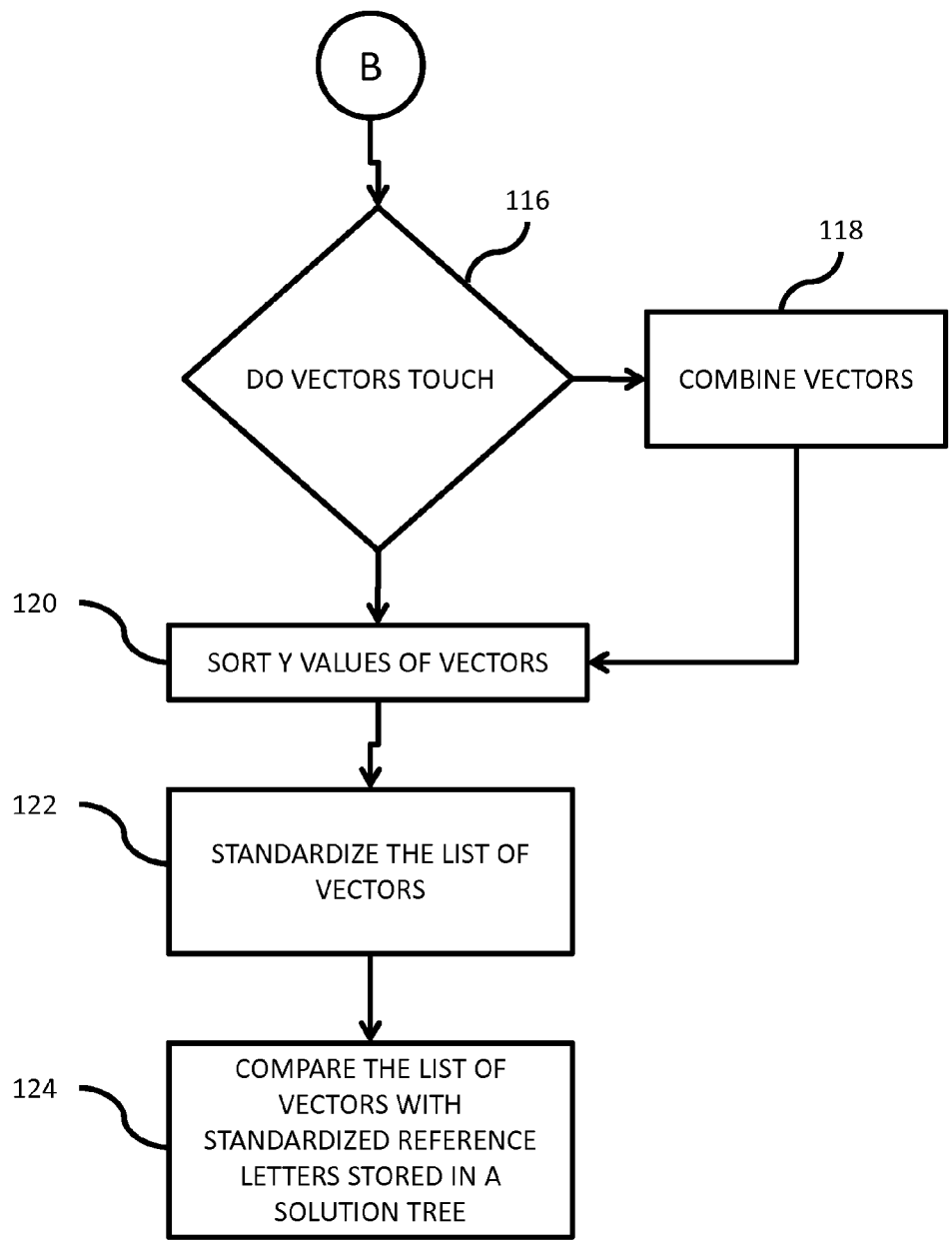
Figure 2:
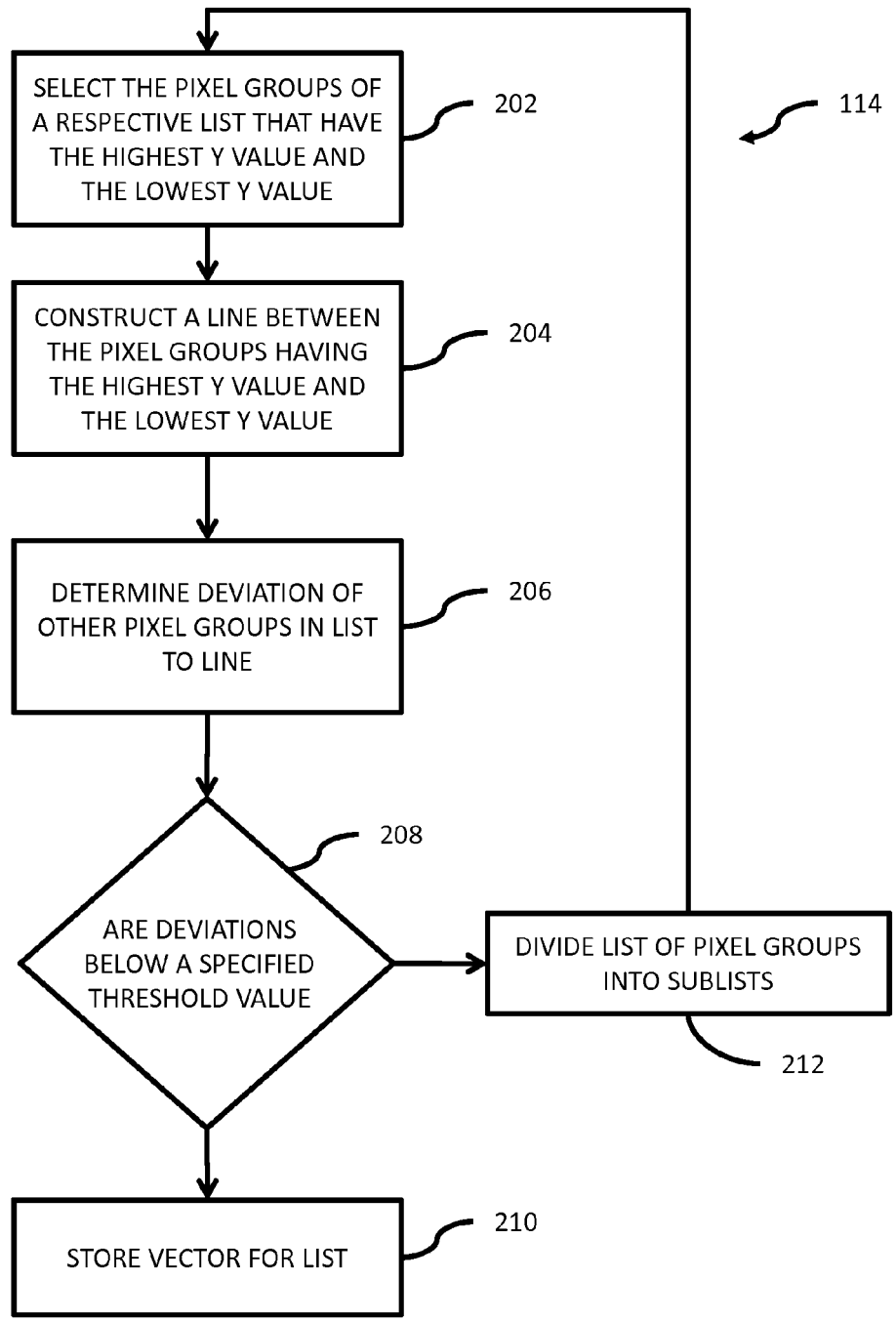
FIG. 2 illustrates a processing sequence for deriving vectors from lists.

Similar pixel groups are each compiled in a separate list for the recognition of the letter, as represented by box 106. Each list thus gained is in the process sorted in such a way that the pixel groups which exhibit a lower Y position are sorted in descending order, as represented by box 108. If several similar pixel groups lie at identical Y positions, new lists are generated for said pixel groups, as represented by boxes 110 and 112. From these lists an attempt is then made to derive corresponding vectors, as represented by box 114. A process for deriving corresponding vectors is provided in FIG. 2. Referring to FIG. 2, in the process the pixel groups with the lowest and the highest Y value are selected from the respective lists, as represented by boxes 208 and 210. Between these pixel group positions now a line is calculated, as represented by box 204. Then the deviations of the other pixel groups to this line are determined, as represented by box 206. If all deviations lie below a specified threshold value, a description vector is found for this list, as represented by boxes 208 and 210. If the deviations lie above a threshold value, the list is divided, as represented by boxes 208 and 212, and an attempt is made to generate corresponding vectors for each sublist. In the process it makes sense to divide the list where the greatest deviations to the calculated line are present. Returning to FIG. 1B, in this manner one obtains a number of vectors. Vectors touching one another are combined in a further vector list and the Y values are correspondingly sorted, as represented by boxes 116, 118, and 120.

This vector list then describes corresponding letters. The vector list is subsequently standardized (e.g. to maximum Y difference), as represented by box 122. Such a standardized vector list can then pass through a solution tree in which the different letters are stored, as represented by box 124. With this approach one will first recognize only some of the letters. However, in this way one obtains the first information about the writing to be recognized. In the case of large characters one will obtain double letters. This is due to the fact that in correspondence to the line width of the letters one time in the light-dark as well as also in the dark-light transition is interpreted as an individual letter. In the process it is to be assumed that the distance of these double letters is relatively constant. This circumstance can however now be used to optimize the form of the used pixel groups in correspondence to the line width. Thus the width of the used pixel group is selected in such a way that it is three times that of the line width. The optimum height of the pixel group is dependent on the font height. With the pixel groups thus optimized now the image is further scanned. Through the enlargement of the pixel groups on the basis of the fewer required internal lists a more rapid processing results, which in addition furnishes more precise results. Since the font type within a text as a rule does not change, there are optimized result trees for each text with this font. If one proceeds from 26 letters, 52 different letters arise from upper-case and lower-case writing. If one proceeds from a binary tree of 128 characters, 7 branches (2 to the power of 7) are sufficient in order to define/determine the letters.

For typewritten text one could further optimize the entire operation of text recognition by storing letters or even syllables already recognized as pixel group masters. Parallel to the above described method it would now be possible to easily recognize e.g. vowels with the pixel group master since they would achieve an extremely high pixel group value.

As an additional option recognition errors could in part be recognized and corrected with dictionaries. The output of the recognized characters can be realized both via a display as well as also via a "speech to text program".

The described method describes an optimized method which forms vectors from pixel-based images, wherein each individual pixel (in the case of a one-line pixel group) only needs to be passed through once. In the case of previously known OCR methods usually prior to this edge enhancement is carried out to increase the recognition rate, and only afterwards does the recognition method begin. In the above described method this takes place in only one step, so that it is both less processor-intensive as well as also more robust.

I claim:

1. A method for the analysis of image data of letters of a language which consist of an array of individual pixels, wherein each pixel exhibits a current pixel value which describes the color or brightness information of the pixel, wherein the following steps are carried out:

a) a determination of a priority value for each pixel of the array is made by fixing the pixel as a reference pixel and calculation of a pixel difference value of the current pixel value of the reference pixel with relation to the current pixel values of a previously defined group of adjacent pixels and a position factor, wherein the position factor is greater, the closer the pixel group is to a start pixel dependent on the language;
b) a combination of the pixels used for the calculation of the priority value into one pixel group;
c) a sorting of the pixel groups based on the priority value of the reference pixel; and
d) saving and/or transferal of the pixel groups according to their priority in the priority array.

2. The method according to claim 1, characterized in that the pixel difference value results from the difference of the pixel value of the reference pixel to the pixel value of at least one of neighboring pixels.

3. The method according to claim 1, characterized in that the pixel difference value relates to a line segment width.

4. The method according to claim 1, characterized in that after Steps a) through d) the following steps are carried out: similar pixel groups are each compiled in a separate list and each list thus gained is in the process sorted in such a way that the pixel groups which exhibit a lower Y position are sorted in descending order, wherein if several similar pixel groups lie at identical Y positions, new lists are generated for said pixel groups, wherein vectors are derived from these lists and the pixel groups with the lowest and the highest Y value are selected and wherein between these pixel group positions a line is calculated and wherein the deviations of the other pixel groups to this line are determined.

5. The method according to claim 4, characterized in that in case all the deviations lie below a specified threshold value, a description vector is found for this list, but if the deviations lie above a threshold value, the list is divided and an attempt is made to generate corresponding vectors for each sublist.

6. The method according to claim 5, characterized in that the list is divided where the greatest deviations to the calculated line are present.

7. The method according to claim 4, characterized in that the vector list is subsequently standardized.

8. The method according to claim 7, characterized in that the standardized vector list passes through a solution tree in which reference letters are stored.

9. The method according to claim 4, characterized in that vectors touching one another are combined in a further vector list and the Y values are correspondingly sorted.

10. The method according to claim 4, characterized in that a width of the pixel group is selected in such a way that it is three times a line width and a height of the pixel group is dependent on a font height.

* * * * *